No. 623,533. Patented Apr. 25, 1899.
W. R. DUNN.
COMPUTING SCALE.
(Application filed Nov. 24, 1897.)
(No Model.) 3 Sheets—Sheet 1.
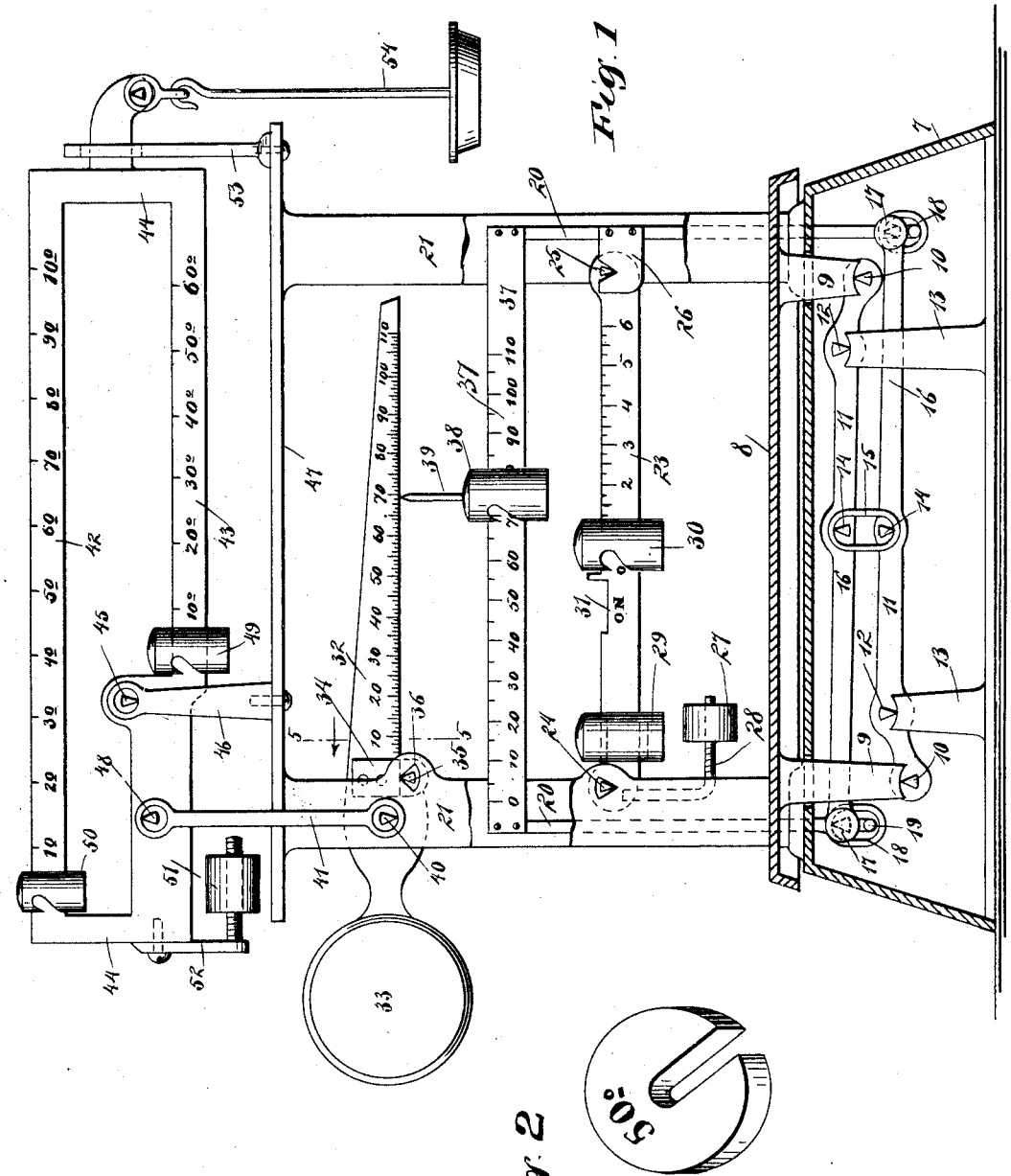

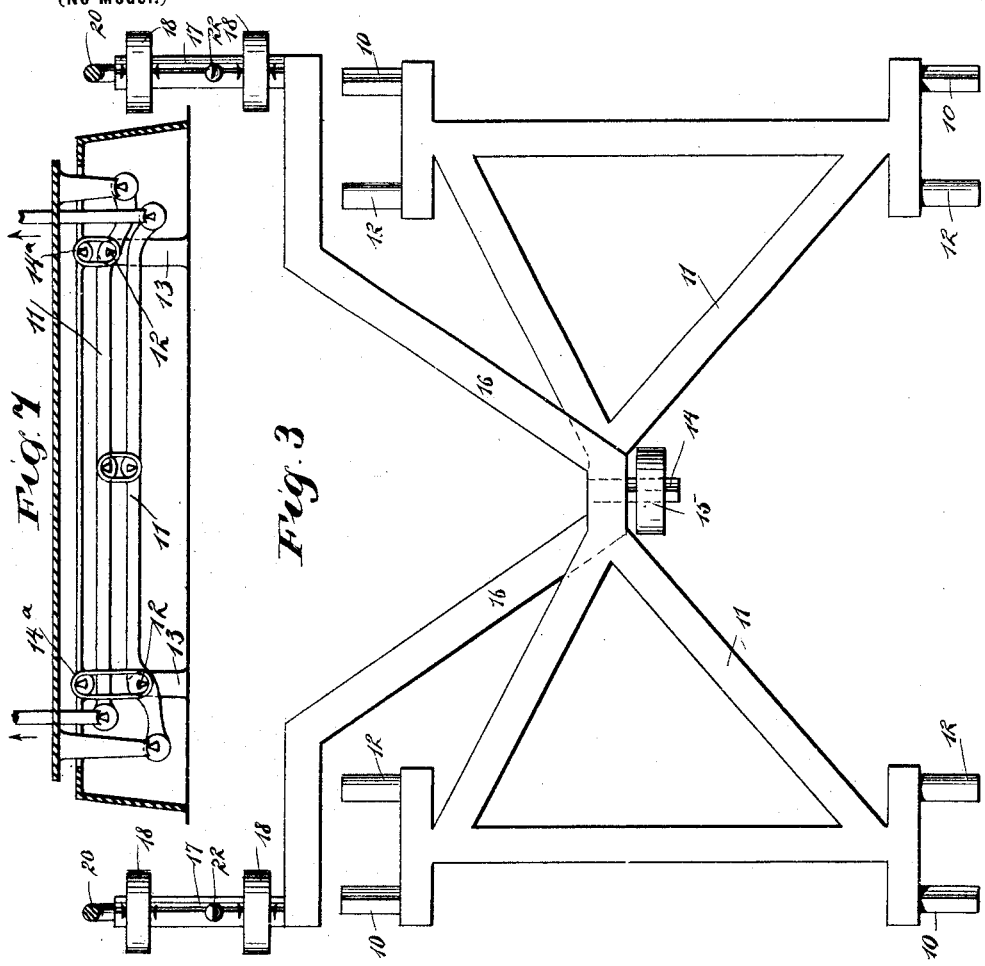

No. 623,533. Patented Apr. 25, 1899.
W. R. DUNN.
COMPUTING SCALE.
(Application filed Nov. 24, 1897.)
(No Model.) 3 Sheets—Sheet 3.
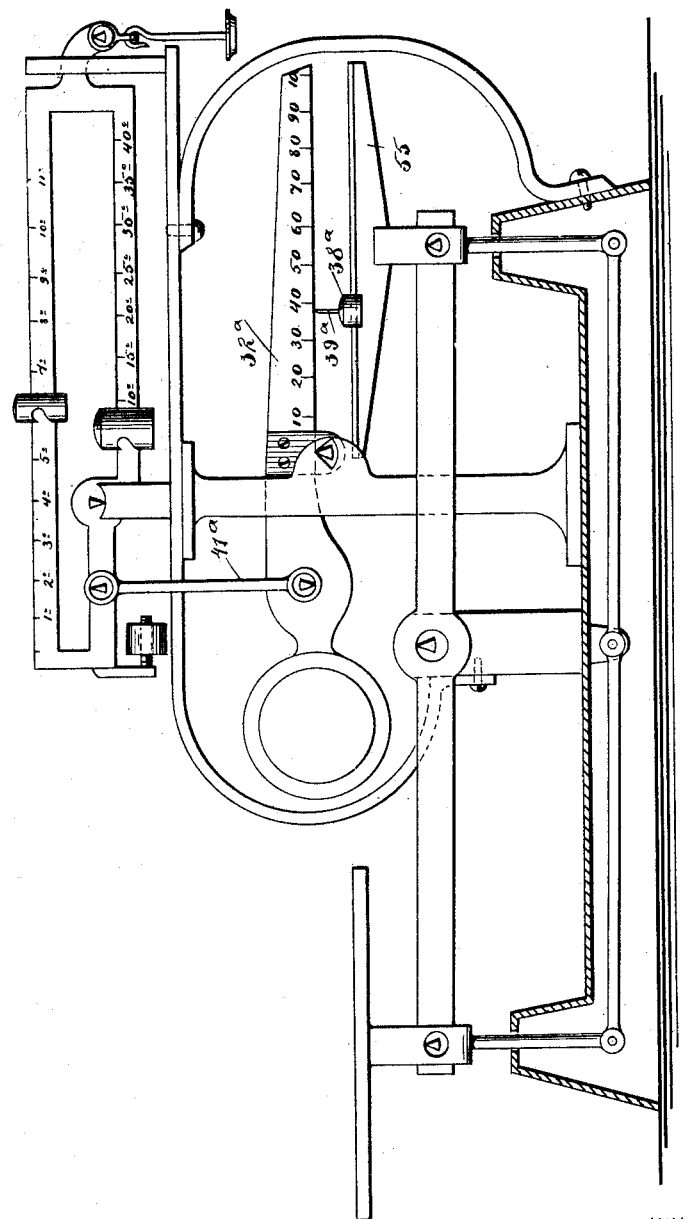

UNITED STATES PATENT OFFICE.

WILLIAM R. DUNN, OF ALTON, INDIANA, ASSIGNOR TO HIMSELF AND JAMES M. JENKINS, OF SAME PLACE.

COMPUTING-SCALE.

SPECIFICATION forming part of Letters Patent No. 623,533, dated April 25, 1899.

Application filed November 24, 1897. Serial No. 659,655. (No model.)

*To all whom it may concern:*

Be it known that I, WILLIAM R. DUNN, of Alton, in the county of Crawford and State of Indiana, have invented a new and Improved Computing-Scale, of which the following is a full, clear, and exact description.

This invention is a computing-scale having a platform actuating a plurality of beams, and the scale having two weights working, respectively, on beams and referring, respectively, to weight and price, so that upon the proper adjustment of those weights according to the price and the desired amount of the article the balancing of the scale will indicate that the proper amount of the commodity is on the scale.

This specification is the disclosure of two forms of my invention, while the claims define the actual scope of the invention.

Reference is to be had to the accompanying drawings, forming a part of this specification, in which similar characters of reference indicate corresponding parts in all the figures.

Figure 1 is a side elevation of the invention with parts broken away and in section. Fig. 2 is a detail perspective view of one of the weights which I employ. Fig. 3 is a plan view of the platform-beams. Fig. 4 is a fragmentary elevation showing the manner of slinging the scale-beams to the platform-beams. Fig. 5 is a sectional view on the line 5 5 of Fig. 1. Fig. 6 is a partial section of a modified form of the invention adapted to a balance; and Fig. 7 is a side elevation of a modified construction of the invention, parts being broken away and in section.

Referring to the form of my invention shown in Figs. 1 to 5, the device has a base 7, on which a platform 8 is supported by means of four legs 9, two of which are shown in the drawings. The legs 9 respectively bear on knife-edges 10, which are four in number and are produced two on each platform-beam 11. The two platform-beams 11 each have two additional knife-edges 12, that respectively bear on pedestals 13, standing within the base 7.

As shown in Fig. 7, the knife-edges 12 bear in swinging loops 14ª, suspended from above said knife-edges. Inward of the knife-edges 12 the beams 11 are provided with knife-edges 14, connected with each other by a link 15, by which means the beams 11 are connected with each other, the beams being arranged one above the other, as shown in Fig. 1. Each beam 11 has its inner end provided with an arm 16, Fig. 3, which arms project oppositely to each other and longitudinally past the adjacent knife-edges 10 and 12 and have their extremities bent transversely to form projections 17. Each projection 17 carries two links 18, Fig. 4, which hang down therefrom and form slings for the feet 19 of the rods 20, such rods extending upward from the projections 17 and respectively through the columns 21 of the scale. A screw 22 is passed through each projection 17 and engages the respective feet 19, so as to prevent excessive play of the parts. By this arrangement the rods 20 are slung on the beams 11, so as to be sensitive to the movements thereof, such movements of the beams 11 being in turn effected by the platform 8, Fig. 1.

A scale-beam 23 is mounted at its left-hand end on the left-hand column 21 through the medium of knife-edges 24, bearing in orifices in the column. The right-hand end of the beam 23 has knife-edges 25, respectively bearing in recesses formed in two plates 26, that are fastened side by side to the right-hand rod 20. The drawings show but one of these plates 26. The poise of the scale-beam 23 may be adjusted by means of a weight 27, working on an angular screw-threaded arm 28, supported from the scale-beam 23. Two weights 29 and 30 slide on the scale-beam 23. The weight 29 is adapted to be seated in a recess 31, formed in the upper edge of the scale-beam 23, when the scoop of the scale is on the platform, whereupon the weight 29 will counterbalance the scoop and maintain the equilibrium of the scale. The weight 30 slides along graduations on the scale-beam 23 and may be used for tare purposes or for balancing the scale after a plate or dish has been placed on the platform.

A beam 32, having its right-hand portion graduated to indicate prices per pound and having its left-hand portion provided with a counterweight 33, is provided with two plates 34, riveted to the beam and having knife-edges 35 bearing upward in orifices 36, formed in the left-hand column 21. Fixed to the upper ends of the rods 20 and extending horizontally between the two is a scale-beam 37, which may be provided with graduations and having a fulcrum 38 slidable thereon. The fulcrum 38 is provided with an upwardly-projecting plate 39, which is adapted to engage the under side of the price-beam 32 and move the beam upward, so that it will swing on the knife-edges 35, the scope of such swinging movement being regulated by the arm 33 and by the position of the fulcrum 38 on the scale-beam 37, and consequently by the point on the price-beam 32 which is engaged by the plate 39. The left-hand end of the price-beam 32 is provided with two knife-edges 40, that respectively engage eyes formed in the lower ends of links 41. The links 41 are two in number and are arranged one on each side of the scale. The drawings show only one link. These links 41 are attached to the main beam of the scale, and the left hand of the price-beam 32 drawing downward actuates said main beam of the scale.

The main beam of the scale is formed of two horizontal parts 42 and 43. These parts are joined to each other by end portions 44 and are each graduated and numbered, so that they will indicate pounds, dollars, and cents. The part 43 of the main beam has two knife-edges 45, bearing on pedestals 46, supported by the top rail 47 of the frame of the scale, such rail in turn being supported by the columns 21. The upper end of each link 41 has an eye, and these eyes respectively receive knife-edges 48, carried one at each side of the part 43 of the main scale-beam. On the part 43 of the main scale-beam a weight 49 is mounted to slide, and a pea 50 is mounted to slide on the portion 42 of the main scale-beam. The poise of this beam is adjusted by means of a weight 51, working on the screw-threaded portion of an arm 52, that is fixed to the beam. The free end of the main scale-beam is guided by means of an arm 53, standing on the rail 47, and the free end of the main scale-beam is also provided with a weight-support 54, pendent therefrom. The weight-support 54 is designed to receive weights such as are shown in Fig. 2. These weights may be provided with numerals, as shown in Fig. 2, such numerals indicating the pounds when weighing for pounds, reading the large figures only, and the numerals indicating cents when weighing for value, reading both large and small figures for cents. Thus "500 cents" ("$5.00") are indicated in Fig. 2. The same system of numbers is used on the main scale-beam.

The invention may be used both for weighing pounds and ounces and also for weighing goods according to the price thereof. To weigh goods, weighing pounds and ounces simply, the fulcrum 38 should be moved on the scale-beam 37 so that the plate 39 will bear against the price-beam 32 at the graduation "10" thereof, such graduation being positioned with the knife-edges 35 directly equidistant between the graduation "10" and the knife-edges 40. Movement transmitted from the platform 8 to the scale-beam 37 will be in turn transmitted to the price-beam 32 and will be transmitted from said beam without variation to the main scale-beam, and such beam will be balanced according to the adjustment of the peas 49 and 50 thereof, which adjustment should have been previously made to accord with the desired weight of merchandise. To weigh the goods according to the price thereof, the graduations on the main scale-beam are considered as dollars and cents. Now should a customer desire fifty cents' worth of goods at ten cents a pound the pea 50 should be moved to the graduation "5°" of the part 42 or 43 of the main scale-beam, and the fulcrum 38 should be moved on the scale-beam 37 until the plate 39 is engaged with the price-beam 32, at the graduation "10" thereof. According to the balancing of the main scale-beam it may be known that the requisite amount of merchandise is on the platform 8. In the use of the scale the peas 29 and 30 should be manipulated for the purposes before described.

The form of my invention shown in Fig. 6 is simply an adaptation of the invention to a balance. This is effected by substituting for one pan of the balance a beam 55, whereon slides a fulcrum $38^a$ similar to the fulcrum 38 and having a plate $39^a$ similar to the plate 39. The plate $39^a$ engages a beam $32^a$ similar to the beam 32, which beam in turn transmits movement to the main scale-beam through the medium of links $41^a$, similar to the links 41. The operation of the invention in this form is exactly the same as in the form first described.

It will be observed that the scale herein shown and described has no surplus beams or counterweights to balance the platform or the levers under the platform, as each counterbalances the other.

Having thus described my invention, I claim as new and desire to secure by Letters Patent—

1. The combination with a frame, of a platform mounted and movable thereon, platform-beams in connection with the platform, rods in connection with the platform-beams and extending vertically, a scale-beam extending horizontally between the rods and rigidly connected thereto, a fulcrum movable along the scale-beam, a second scale-beam pivoted on the frame and having pivotal connection with one of said rods, weights movable on the second scale-beam, a price-beam mounted on the frame and engaged by the fulcrum on the first-named scale-beam, a main scale-beam mounted on the frame, and a connection between the price-beam and the main scale-beam.

2. The combination of a frame, a platform mounted on the frame, platform-beams beneath the platform and supporting the same, vertically-extending rods connected with the platform-beams, a horizontal scale-beam rigidly attached to the rods and extending between the same, a second scale-beam pivotally mounted on the frame and pivotally connected with one of the rods, a weight movable on each of the scale-beams, a price-beam mounted on the frame and engaged by one of the weights, a main scale-beam mounted on the frame, the main scale-beam having two parallel portions, a weight movable on each of said portions, and a link connecting the price-beam with the main scale-beam.

3. In a scale, the combination with a frame, of a platform, two platform-beams mounted beneath the platform and supporting the platform, an extension carried by each platform-beam, the extensions running oppositely to each other and having laterally-bent end portions, links carried on said end portions, and scale-beam mechanism hung in said links and actuated by the scale-beams.

4. The combination with a frame, of a platform, and platform-beams, a scale-beam having connection with the platform-beams and moved vertically thereby, a fulcrum movable along the said scale-beam, a price-beam having upwardly-disposed knife-edges bearing against the frame, the price-beam being engaged by the fulcrum of the said scale-beam, a main scale-beam mounted on the frame, and a link connecting the price-beam with the main scale-beam.

5. The combination with a frame and platform mechanism, of a horizontally-disposed beam moved vertically by said platform mechanism, a fulcrum movable along the beam, a price-beam located above the fulcrum and capable of being engaged thereby, the price-beam having upwardly-disposed knife-edges bearing against the frame, a main scale-beam mounted on the frame, and a connection between the price-beam and the main scale-beam.

6. In a scale, the combination with a frame, of a platform, two platform-beams fulcrumed beneath the platform on a stationary support and projected toward each other from said fulcrums, a link connecting the beams at their inner or free ends, the beams supporting the platform, an arm for each beam, the arms running oppositely to each other and respectively toward the fulcrum of the beams, and scale mechanism connected with the arms of the beams.

WILLIAM R. DUNN.

Witnesses:
J. M. JENKINS,
M. D. JENKINS.